May 19, 1925.
A. J. MOXHAM
1,538,837
MANUFACTURE OF ALUMINUM SULPHATE
Filed July 25, 1922
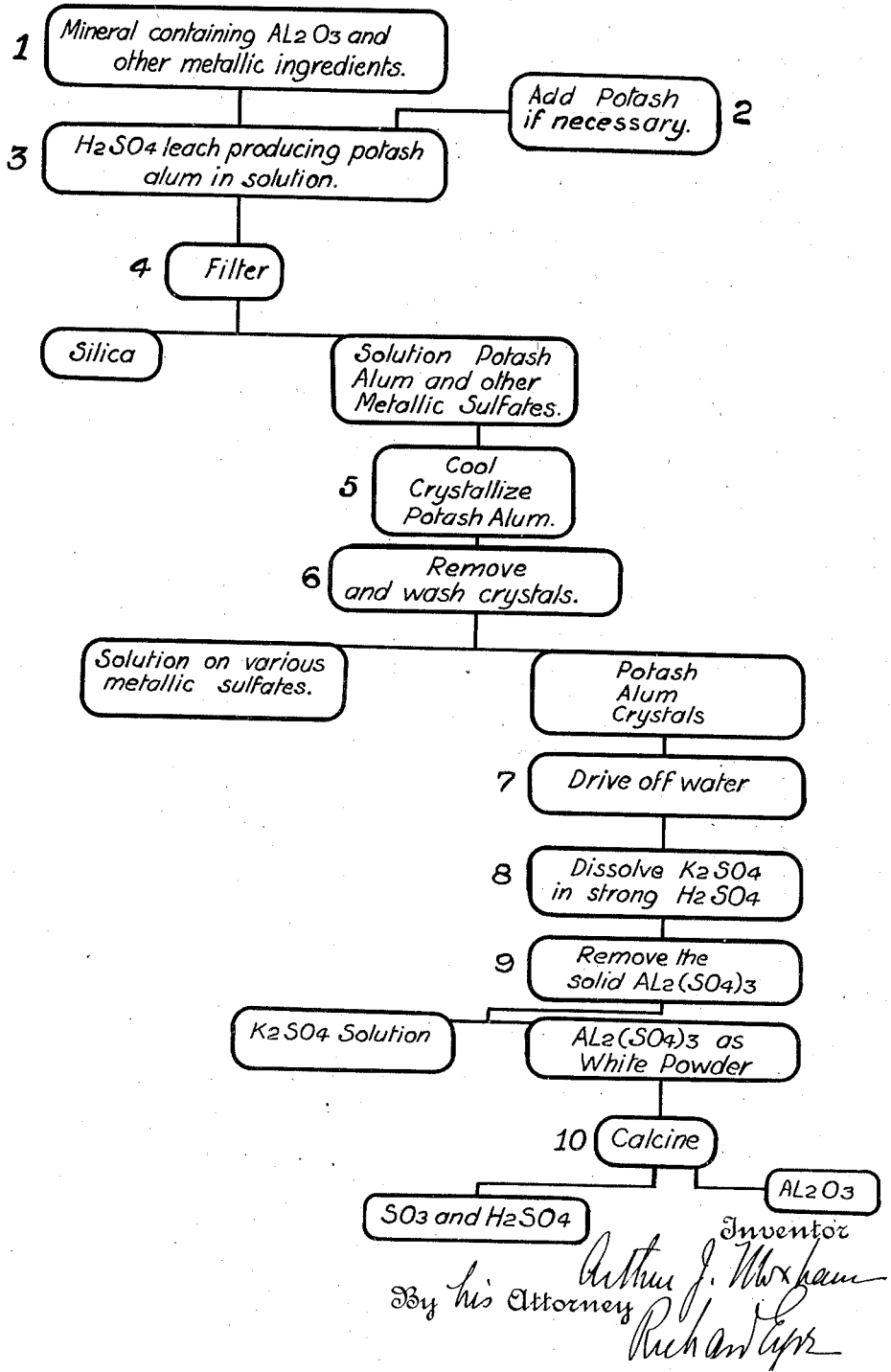

Patented May 19, 1925.

1,538,837

UNITED STATES PATENT OFFICE.

ARTHUR J. MOXHAM, OF GREAT NECK, NEW YORK, ASSIGNOR, BY MESNE ASSIGNMENTS, TO J. P. LAFFEY, TRUSTEE, OF WILMINGTON, DELAWARE.

MANUFACTURE OF ALUMINUM SULPHATE.

Application filed July 25, 1922. Serial No. 577,452.

*To all whom it may concern:*

Be it known that I, ARTHUR J. MOXHAM, a subject of the King of Great Britain, and a resident of Great Neck, in the county of Nassau and State of New York, have invented certain new and useful Improvements in the Manufacture of Aluminum Sulphate, of which the following is a specification My invention relates to the treatment of minerals containing alumina. Such minerals contain iron oxide and other metallic oxides or salts. My process is adapted to the economical separation and commercial production of alumina from ores, such, for example, as many low grade iron ores which heretofore have ordinarily not been treated at all for any of their metallic contents, or if thus treated the alumina contents have been wholly lost. An example of such a mineral or iron ore which exists in large quantities and which has heretofore been almost wholly unworked is green sand or glauconite. Another example of a mineral from which I am able to economically obtain alumina by my process is the Oriskany iron ore of the Southern States. By my process I am also able to economically separate and recover any potash which the mineral contains.

In accordance with my process I convert the alumina in the mineral into sulphate of alumina and combine the sulphate of alumina with sulphate of potash and water to produce potash alum, which has the formula $Al_2(SO_4)_3 + K_2SO_4 + 24H_2O$. The potash alum separates from the other ingredients of the ore or mineral by crystallization, and the sulphate of alumina is thereafter obtained therefrom as a pure salt by treating the potash alum crystals with strong sulphuric acid which dissolves the sulphate of potash, leaving the sulphate of aluminum undissolved as a white powder. The sulphate of aluminum is readily convertible into alumina with the recovery of the $SO_3$ gas as fuming sulphuric acid. The potash needed in my process is in the case of some minerals, as, for example, green sand, present in large quantity in the mineral, in which case the potash is separately recoverable as a valuable commercial product. If not present, however, in sufficient quantity, a potash salt or other potash bearing material may be added to the material to be treated in sufficient quantity to permit the entire alumina contents of the mineral to be made a constituent of potash alum.

My process may be practiced without substantial loss of any of the reagents employed and with small expenditure for heat and for labor. Moreover, some of the steps of my process effect reactions which are involved in processes for the production of iron and other metals, and this adds to the efficiency and economy of the process.

The drawing accompanying this specification is a flow sheet showing a series of specific steps constituting one specific embodiment of my process.

I start at 1 with the mineral to be treated, which, as before stated, may be green sand or glauconite or any other mineral containing alumina and a large amount of potash with other metallic and non-metallic ingredients, or it may be material such as an Oriskany iron ore which contains no substantial amount of potash. The mineral is preferably crushed so that it may be more readily leached with sulphuric acid.

If the mineral has insufficient potash contents to enable the alumina contents of the mineral to combine with the potash to form potash alum, then in the next step, 2, I add sufficient potash to enable this result to be produced. This potash may be added as a salt, preferably in the form of sulphate or sufficient potash bearing raw material may be added. Although the potash salt is relatively expensive, it is not prohibitive to employ it in the process, because, as will presently appear, it is recovered later with negligible loss, and it may be used over and over again. If desired, the sulphate of potash later recovered may be sold as such. The potash thus added to the mineral should be added to the mineral before or during leaching. On the other hand, if the potash contained in the material is in excess, material containing alumina may be added in suitable quantity to enable all the excess of potash to be recovered.

I next, as indicated in 3, leach the mineral (with or without additional potash or alumina, as already explained) with sulphuric acid under conditions that will cause the metallic ingredients of the mineral to be dissolved and which will cause the alumina to combine with potash and water to form potash alum. To obtain the most efficient and quickest results, the sulphuric acid should be dilute enough to contain the necessary quantity of water to supply the 24 molecules of water for the potash alum. An excess of water is not harmful, because it is preferable that the leaching is carried on at or near the boiling point, and any reasonable excess of water is driven off by heat during the leaching operation. The right amount of water in the leach can be closely regulated. If too much is present it can be driven off by the heat or by adding fuming sulphuric acid to the leach or by both. If too little is present, water can be directly added to the leach.

I have found that a sufficiently dilute sulphuric acid to effect a reasonably rapid production of the potash alum is of suitable strength for dissolving the other metallic ingredients of minerals, such, for example, as the iron contents. The details of such a leaching process for the recovery of iron from iron ores is set forth in a pending application of A. W. Davidson, Serial #378,157, filed May 1, 1920.

At the end of step 3, therefore, the bath contains the silica ingredients of the mineral as solid, undissolved matter, mainly as pure silica, and in solution the potash alum, ferric sulphate and sulphates of any other metals that are ordinarily found in such minerals.

I next separate the undissolved ingredients from this solution as by the filtering step 4, taking care to thoroughly wash the solid matter to avoid waste of the dissolved sulphates.

The next step, indicated at 5, is to cool the solution and thereby cause the potash alum to crystallize therefrom.

It is possible to produce these potash alum crystals from the mineral or the mineral mixed with additional potash by a cold process if desired. In this case, the material to be treated is allowed to stand in strong sulphuric acid—that is, sulphuric acid carrying less than the proper amount of water. After many days, enough water will be absorbed from the atmosphere to secure the needed balance and the potash alum crystals will then gradually form. These can be removed from time to time until the crystals cease to form.

The next step of the process, indicated at 6, is to remove the crystals and to wash them in cold water. This washing should be done as quickly as in a centrifuge, or with suction, as the crystals dissolve slowly in cold water. Although a small amount of potash alum will be thus dissolved in the washing, this involves no waste as the wash water may be used over again and the potash alum therefore finally recovered from it.

I next, as indicated at 7, subject the potash alum crystals to heat to drive off the water and render the sulphate of aluminum anhydrous. The crystals melt at 84.5° C., and most of the water is driven off at 190° C., the last molecule being driven off at about 300° C. It is not necessary to drive off all the water by heat. The bulk of the water may be driven off and concentrated sulphuric acid can then be added to take out the last of it. This acid, if added in the proper quantity, will dissolve the sulphate of potash and thus separate it from the anhydrous sulphate of alumina which remains undissolved in the form of a white powder.

The sulphate of alumina is then, as indicated at 9, removed as by decanting. If it is desired to sell this sulphate of alumina, which is a valuable, marketable product, it is quickly washed in cold water to remove the adhering sulphuric acid, and this water is used over again for washing or diluting the acid.

To carry the process further to obtain pure alumina, the sulphate of alumina is, as indicated at 10, calcined at, say, 800° to 900° C., and the $SO_3$ gas and adhering sulphuric acid are driven off and condensed for reuse or for sale as concentrated acid.

The potassium sulphate solution is in proper form to be used over again for the treatment of further material or it may be separately treated and sold as potash, if it is more profitable to do so.

Having thus described my invention, what I claim and desire to protect by Letters Patent is:

The process of treating potash-alum which consists in first driving off the water and then separating the sulphates by dissolving the potassium sulphate in strong sulphuric acid and then separating the aluminum sulphate residue from the solution.

In testimony whereof, I have signed my name to this specification.

ARTHUR J. MOXHAM.